(12) United States Patent
Denecheau et al.

(10) Patent No.: US 7,248,601 B2
(45) Date of Patent: Jul. 24, 2007

(54) METHOD OF ALLOCATING BANDWIDTH ON REQUEST TO THE STATIONS OF A LOCAL AREA NETWORK

(75) Inventors: Lionel Denecheau, La Colle sur Loup (FR); Denis Esteve, Vence (FR); Patrick Sicsic, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 10/215,611

(22) Filed: Aug. 9, 2002

(65) Prior Publication Data

US 2003/0035436 A1 Feb. 20, 2003

(30) Foreign Application Priority Data

Aug. 9, 2001 (FR) ................. 01 480075

(51) Int. Cl.
*H04L 12/42* (2006.01)
(52) U.S. Cl. ...................... 370/452; 370/468
(58) Field of Classification Search ............ 370/450, 370/452, 465, 451
See application file for complete search history.

(56) References Cited

U.S. PATENT DOCUMENTS

| | | | | |
|---|---|---|---|---|
| 4,779,267 A | * | 10/1988 | Limb | 370/232 |
| 5,274,644 A | * | 12/1993 | Berger et al. | 370/230 |
| 5,390,182 A | * | 2/1995 | Zheng | 370/236 |
| 5,446,737 A | * | 8/1995 | Cidon et al. | 370/452 |

* cited by examiner

*Primary Examiner*—Hassan Kizou
*Assistant Examiner*—Bo Hui A Zhu
(74) *Attorney, Agent, or Firm*—Kunzler & McKenzie

(57) ABSTRACT

A method of bandwidth management enabling to insure a guaranteed bandwidth to each station of transmission network comprising a plurality of stations (10, 12, 14) forming a logical ring wherein a token frame is circulating from station to station, each station being allowed to transmit a credit (c) of data bytes upon reception of the token frame wherein the credit is increased in proportion to a variable TRTT standing for Token Round Trip Time which is the time taken for the token frame to circulate around the logical ring since the preceding reception of the token frame by the station. The credit is increased in proportion of a variable CIR standing for Committed Information Rate which is the guaranteed transmission rate that the station can use to transmit data wherein the value of CIR is determined by a class of bandwidth which has been previously selected by the station upon the preceding reception of the token frame by the station.

17 Claims, 4 Drawing Sheets

METHOD OF ALLOCATING BANDWIDTH ON REQUEST TO THE STATIONS OF A LOCAL AREA NETWORK

TECHNICAL FIELD

The present invention relates to the bandwidth management between the stations in a data transmission network of the Ethernet type and relates particularly to a method of allocating bandwidth on request to the stations of a Local Area Network such as Ethernet network.

BACKGROUND

On local Area Networks (LANs) of the Ethernet type able to transmit the data at speeds higher than one gigabit/s, an unlimited number of stations can be connected to a shared medium. To control the exchange of data between the stations connected on the shared medium, Ethernet uses a protocol called Carrier Sense, Multiple Access Collision Detect (CSMA/CD). The "Multiple Access" part means that every station is indeed connected to the shared medium forming a single data path. The "Carrier Sense" part means that before transmitting data, a station checks it to see if any other station is already sending something. If the transmission medium appears to be idle then, the station can actually begin to send data. However, two stations can start transmitting at the same time, causing a collision. When this occurs, each interfering station is made able to detect it. Hence, all stations attempt to transmit, back off, and try a retransmission at randomly selected later times thus minimizing the chance of another collision.

Although Ethernet does not set an upper limit to the number of stations that can be connected on a same transmission medium there are, in practice, drastic limitations. Generally speaking, as more users are added to a shared network or, as applications requiring more data are added, performance inevitably deteriorates. This is because all users become competitors in trying to use a common resource: the shared transmission medium. It is generally agreed that, on a moderately loaded 10 Mbps Ethernet network, being shared by 30-50 users, the network can only sustain throughput in the neighborhood of 2.5 Mbps after accounting for packet overhead, inter packet gaps and collisions resulting of the use of the here above CSMA/CD protocol. Thus, yet simple, CSMA/CD protocol, suffers drastic limitations in its ability to take advantage of the intrinsic performance of the shared transmission medium i.e., 10 Mbps in this example. Further increasing the number of users (and therefore packet transmissions) creates an even higher collision potential. Since collisions occur when two or more stations attempt to send information at the same time, when these stations realize that a collision has occurred, they must, to obey standard, all shut off for a random time before attempting another transmission. This tends to add a considerable overhead, severely impacting performance, until the mechanism just collapses when medium is attempted to be too much utilized.

One well-known solution to alleviate this problem is to segment traffic over independent, disjoint, smaller collision domains, but at the expense of having to put in place extra devices to allow communication between the independent pieces thus created of a LAN. This may be a bridge or a switch. For example, an eight-port high-speed switch can support eight Ethernets, each running at a full 10 Mbps so as to be able to interconnect more users on what appear to them as a single LAN. Such a solution consisting in creating a more expensive and complicated network goes against the original objectives of the Ethernet LAN that wanted to be a very inexpensive solution, simple to administrate for local communications, over a campus or between the employees of a company dispersed over a group of buildings.

Another solution consists in implementing a passing-token mechanism of Token Ring LAN type so that the physical Ethernet network becomes collision free and therefore can be used at higher rates. In this mechanism, a logical ring is formed between connected stations and a token is circulated among those of the connected stations part of the logical ring. Then, transmitting from any one station part of the logical ring is only permitted while holding the token thereby, preventing collisions from happening. But, even though the above system prevents the collisions between stations from happening, it does not prevent a station from monopolizing the bandwidth while the other stations cannot transmit.

The above drawback can be solved by using a method wherein a credit of data bytes is allowed to each station and can be transmitted upon reception of the token by the station, such a credit being increased in proportion to the time spent since the preceding reception of the token. Unfortunately, the need of a station varies during the time. A station may need to use a lot of bandwidth at a certain time and less bandwidth later on. Typically, the needs for bandwidth are related to the applications running on the station. If a station is configured with a static credit of bytes which is too low for running an application, this one will experience some problems (jitter, lost packets . . . ). Conversely, if the station is configured with a high credit of bytes, the application will work correctly but the station will keep a high credit, even after the application has been ended, resulting in a part of bandwidth which is no more used and cannot be used by the other stations of the logical ring.

SUMMARY OF THE INVENTION

Accordingly, the main object of the invention is to provide a method of allocating bandwidth to any station belonging to a logical ring in an Ethernet network upon request of the station The invention relates therefore to a method of bandwidth management enabling to insure a guaranteed bandwidth to each station of a transmission network comprising a plurality of stations forming a logical ring wherein a token frame is circulating from station to station, each station being allowed to transmit a credit (c) of data bytes upon reception of the token frame wherein the credit is increased in proportion to a variable TRTT standing for Token Round Trip Time which is the time taken for the token frame to circulate around the logical ring since the preceding reception of the token frame by the station. The improvement is that the credit is increased in proportion of a variable CIR standing for Committed Information Rate which is the guaranteed transmission rate that the station can use to transmit data wherein the value of CIR is determined by a class of bandwidth which has been previously selected by the station upon the preceding reception of the token frame by the station.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
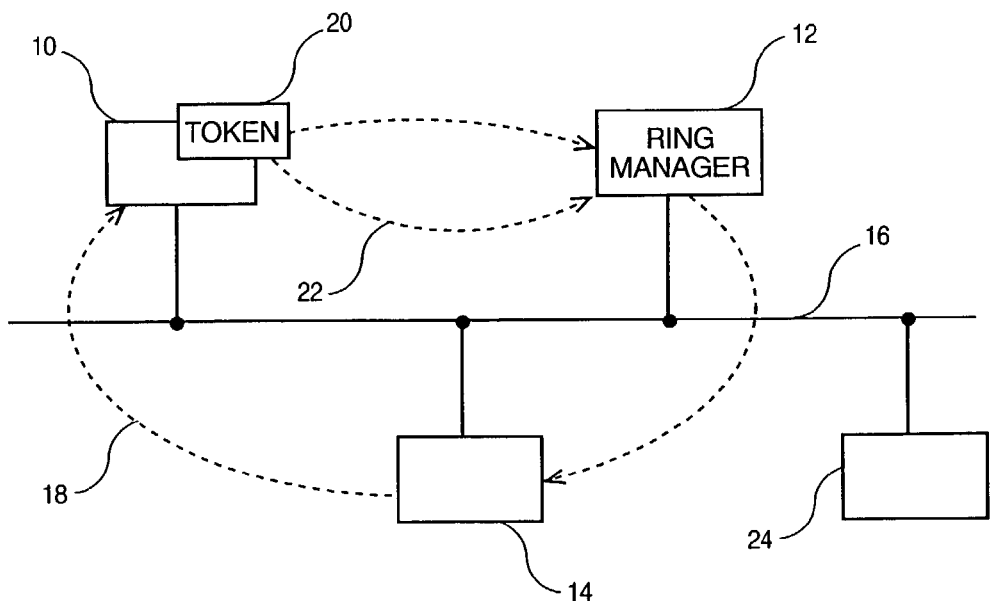
FIG. 1 is a schematic representation of some stations of an Ethernet network organized in a logical ring wherein the invention is implemented.

According to FIG. 1, an Ethernet LAN includes several stations 10, 12 and 14 physically connected on the shared medium 16, exactly as with a regular collision Ethernet LAN, and organized so that they form a logical ring 18. This is achieved through the circulation of a token 20 which takes the form of a special Ethernet frame, forwarded 22 from one station to a next one, e.g., from station 10 to station 12.

It is worth noting here that not all stations connected on the same LAN segment need to participate into the collision-free ring 18 thus formed. The invention assumes that both types of protocols (collision and collision-free) may coexist at any given instant so that a station like 24 needs not to implement the new protocol while still being able to communicate with all the others connected on the shared transmission medium 16 however, using the regular collision protocol.

It must also be noted that one of the stations whithin the ring, for example the station 12, is the ring manager at a given time. Such a ring manager in charge of managing the logical ring is generally the first station which has been incorporated in the logical ring.

Figure 2:
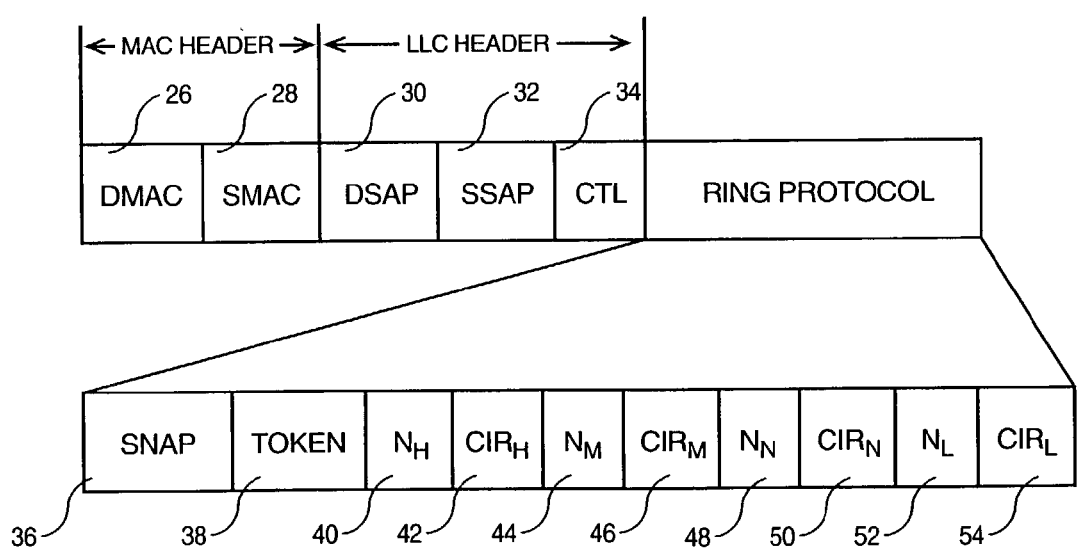
FIG. 2 illustrates the format of a token used in a logical ring according to FIG. 1.

As represented in FIG. 2, the token frame includes three parts: the MAC header, the LLC header and the ring header.

MAC Header (Standard)
An Ethernet Destination MAC address 26, i.e. the MAC address of the next ring station.
An Ethernet Source MAC address 28, i.e. the MAC address of the station sending the token frame.

LLC Header (Standard)
A destination SAP (Service Access Point) 30 which, in the OSI model is due to identify the individual application on a host which is sending a packet. The destination SAP address is the standard way of actually defining the type of application in the following SNAP (Sub-Network Access Protocol) field.
A source SAP 32, i.e. the counterpart of the here above destination SAP.
A control field 34 which indicates this is a UI (Unnumbered Information) frame.

Ring Protocol (Specific of the Logical Ring)
A SNAP 5-byte header field introducing a new Ether-type, i.e. a collision-free Ethernet ring 36.
A 1-byte token field 38 to help managing the circulation of the token, however not mandatory, and which takes a default HEX value of 00.
A set of 8 2-byte fields corresponding to 4 groups composed of a first field containing a number N and a second field containing a number CIR. Each group corresponds to a class of bandwidth selected as described hereafter among 4 classes associated with 4 different bandwidth values: High, Medium, Normal and Low. Accordingly, each group is associated with indicia H, M, N and L corresponding to the class of bandwidth. Thus, the first group corresponding to the High class includes a first field 40 containing $N_H$ and a second field 42 containing $CIR_H$, the second group corresponding to the Medium class includes a first field 44 containing $N_M$ and a second field 46 containing $CIR_M$, the third group corresponding to the Normal class includes a first field 48 containing $N_N$ and a second field 50 containing $CIR_N$ and the fourth group includes a first field 52 containing $N_L$ and a second field 54 containing $CIR_L$. Note that CIR stands for Committed Information Rate which is the guaranteed transmission rate in bits/second that the station can use to transmit data in a selected class of bandwidth as explained hereafter.

Figure 3:
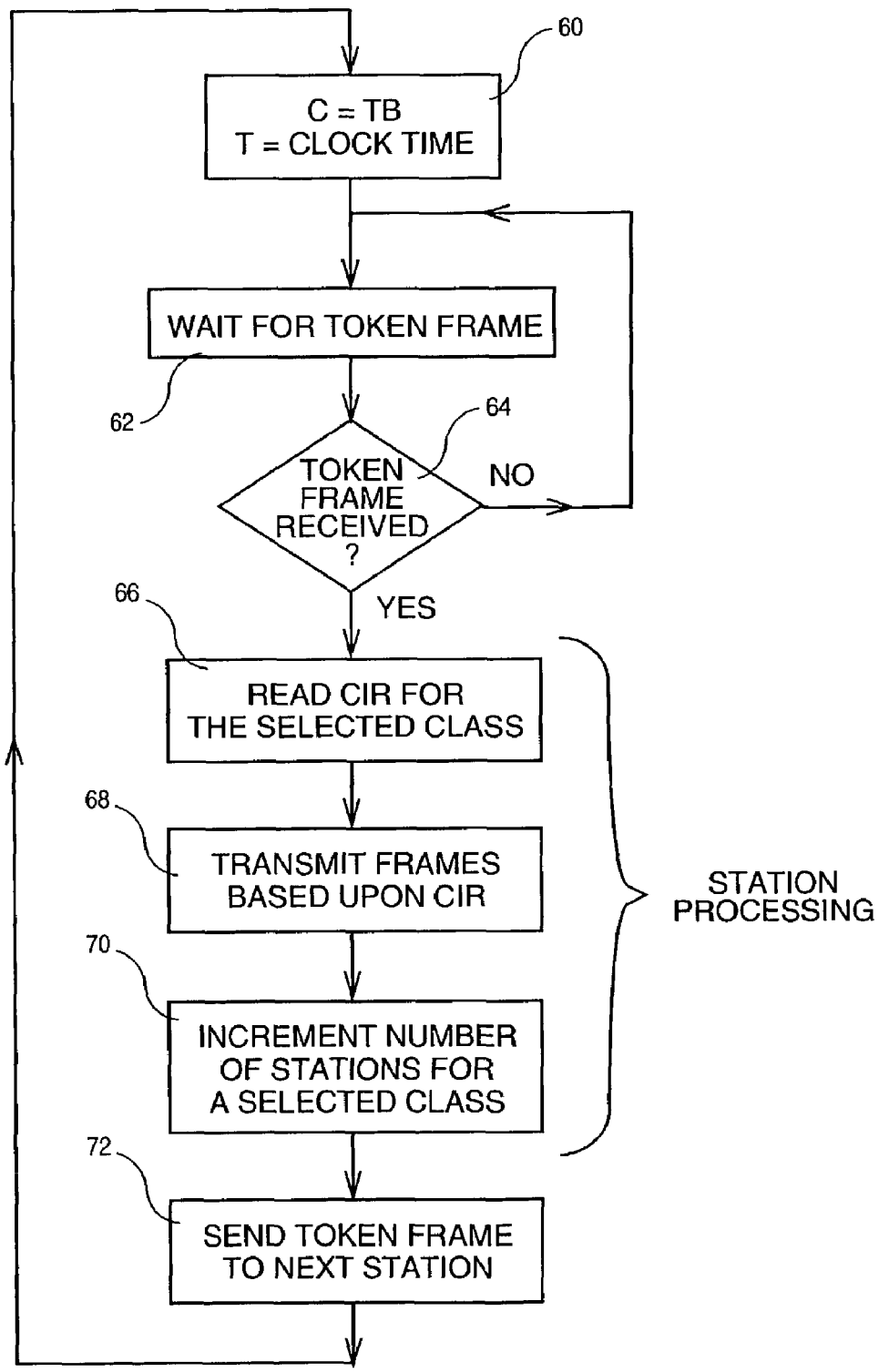
FIG. 3 represents a flow chart of the steps of the method according to the invention used by each station when receiving the token frame.

Referring to FIG. 3, at the initial time, the station initializes two variables C and T (step 60). C, which is the credit allocated to the station, is generally set to TB standing for Transmission Burst, which is the maximum of data bytes the station may transmit on the network upon reception of the token frame. T is set to the clock time.

After the initialization of the station parameters, the station waits for the token frame (step 62) and loops back as long as the token frame is not received (step 64). Upon receiving the token frame, the station reads the CIR value associated with the class of bandwidth selected previously by the station (step 66). Based upon the CIR value, the station transmits its data frames over the network (step 68).

Then, the station increments the number of stations N corresponding to a selected class High, Medium, Normal or Low (step 70) and sends the token frame to the next station of the logical ring (step 72). Note that a station may subscribe to any of the 4 classes at any time. Typically, when a station inserts to the logical ring, it will subscribe to the Low bandwidth class. Assuming an application requiring more bandwidth is started on the station, there will be a communication process between the operating system of the station and the microcode in charge of the CIR process that will trigger a request for more bandwidth. The station will then subscribe to another class (High, Medium or Normal) according to the application and the required bandwidth. When the application is stopped, the station subscribes generally to the Low class again to release bandwidth for the other stations.

Figure 4:
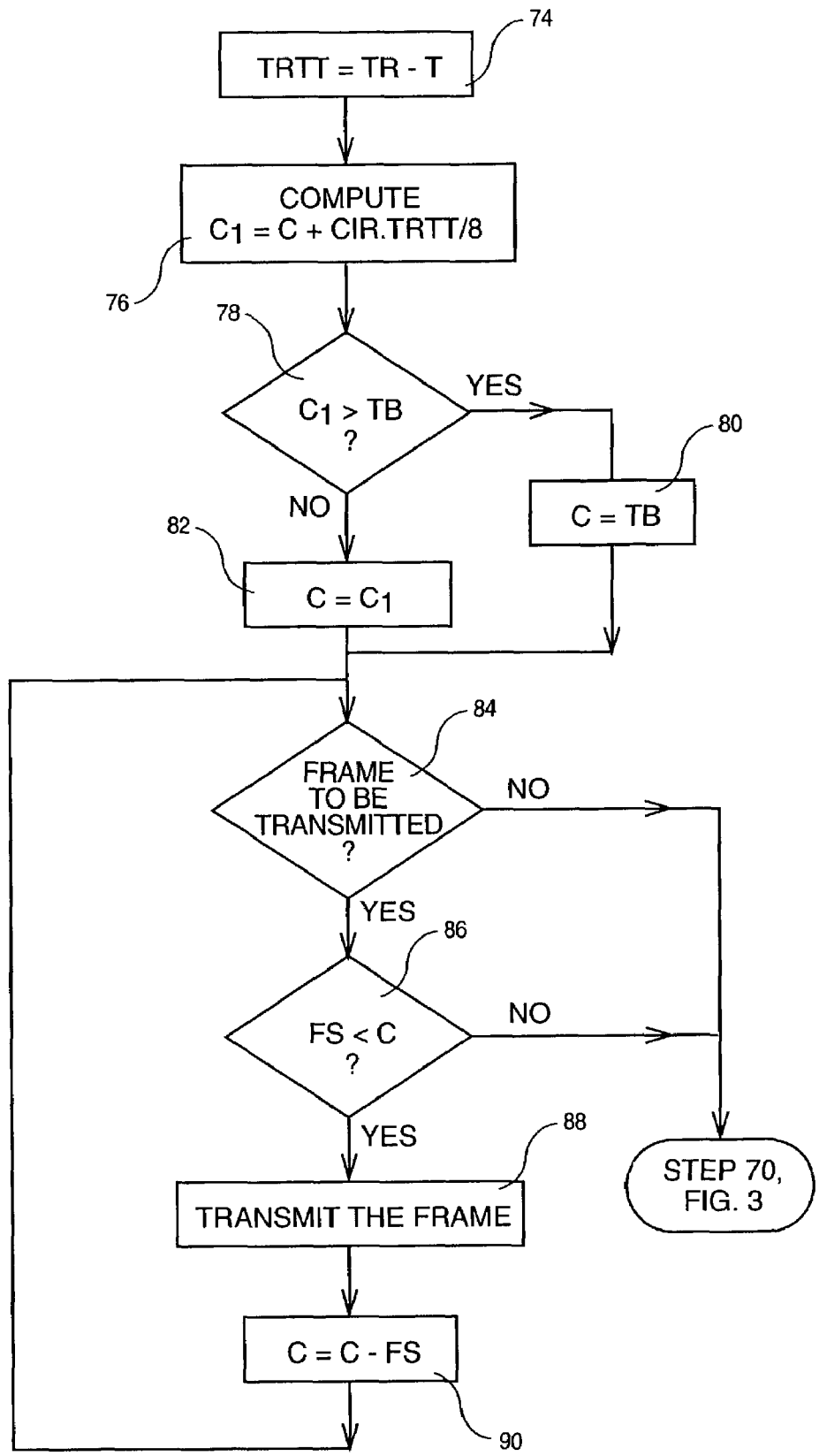
FIG. 4 is a flow chart representing the specific steps of the method according to the invention used by each station for transmitting its data frames.

Now, FIG. 4 illustrates the process achieved in the station to transmit data frames according to step 68 of FIG. 3. First, the station records the reception time $T_R$ of the token frame and sets a variable TRTT to $T_R$-T (step 74), TRTT standing for Token Round Trip Time which is the time in seconds taken for the token frame to circulate around the logical ring since the preceding reception of the token frame by the station.

Then, the processing unit of the station computes (step 76) an intermediary variable as follows:

$$C_1 = C + CIR.TRTT/8$$

which means that the credit of the station can be increased by a number of bytes which is proportional to the token round trip time of the token from the preceding reception by the station. At this step, it is checked whether the value of $C_1$ is greater than TB (step 78). If so, C is set to TB (step 80)

since TB is the maximum of bytes which are allowed to be transmitted. If not, the value of C is set to $C_1$ (step 82).

Then, it is determined whether the station has at least one frame to be transmitted (step 84). In such a case, it is checked whether the size FS of the frame to be transmitted is less than or equal to the credit C (step 86). If so, the frame is transmitted (step 88) and the credit is decremented and set to the new value (step 90):

$$C=C-FS$$

Then, the process is looped back to the step of determination whether there is a frame to be transmitted (step 84). The process is repeated as long as there is a frame to be transmitted and if there is a credit sufficient to transmit the frame. When there is no frame to be transmitted or if the size of the frame exceeds the credit C, the process of frame transmission is linked to step 70 of FIG. 3.

As already mentioned, a specific station called the ring manager, is in charge of managing the logical ring and of computing the network utilization. For this, the ring manager is in charge of computing the CIR values for each of the four classes. These values are based upon the total bandwidth on the network (10 Mbps, 100 Mbps or 1 Gbps) and the number of stations into each of the four classes.

If TotBandwidth is the total bandwidth on the logical ring, the goal is to provide:

$CIR_N = K_N \cdot CIR_L$
$CIR_M = K_M \cdot CIR_L$
$CIR_H = K_H \cdot CIR_L$ the coefficients $K_N$, $K_M$ and $K_H$ having predefined integer values such as:

$K_N = 2$
$K_M = 3$
$K_H = 4$

With such values, a station having selected the High class will be provided with a $CIR_H$ which is 4 times the value $CIR_L$, a station having selected the Medium class will be provided with a $CIR_M$ being 3 times $CIR_L$ and a station having selected the Normal class will be provided with a $CIR_N$ being 2 times $CIR_L$.

Accordingly, $TotBandwidth = N_H \cdot CIR_H + N_M \cdot CIR_M + N_N \cdot CIR_N + N_L \cdot CIR_L$ $$Tot\text{Bandwidth} = (K_H \cdot N_H + K_M \cdot N_M + K_N \cdot N_N + N_L) \cdot CIR_L$$

therefore, $$CIR_L = \frac{TotBandwidth}{K_H \cdot N_H + K_M \cdot N_M + K_N \cdot N_N + N_L}$$

Which gives with $K_H=4$, $K_M=3$ and $K_N=2$:

$$CIR_L = \frac{TotBandwidth}{4N_H + 3N_M + 2N_N + N_L}$$

Note that the number of classes of bandwidth could be different from 4. Assuming there are n classes of bandwidth, the total of bandwidth is then:

$$TotBandwidth = \sum_{i=1}^{n} Ni \cdot CIRi$$

with the value of each CIR being defined as $CIRi = Ki \cdot CIR_1$, the value of $CIR_1$ is computed as follows:

$$CIR_1 = \frac{TotBandwidth}{N_1 + \sum_{i=2}^{n} KiNi}$$

The above formula ensures that a station in the High class will always get a higher CIR than a station in the Medium class, and so on . . . On the other hand, when a station subscribes to the High class, the CIR for all the classes is decreasing. Ultimately, if all the stations subscribe to the High class, they will share an equal part of the total bandwidth.

Figure 5:
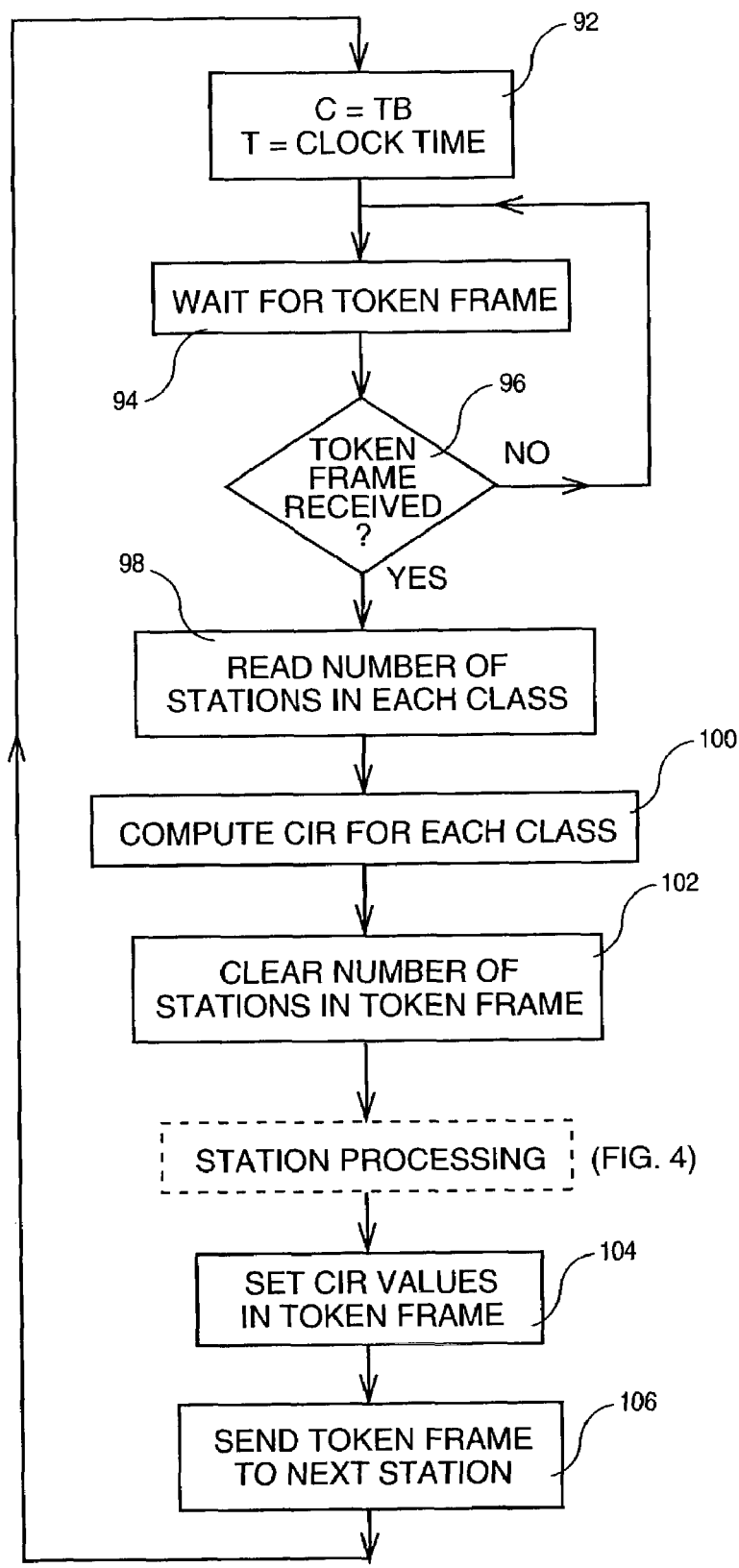
FIG. 5 is a flow chart representing the steps performed by the ring manager of the logical ring when receiving the token frame.

The process achieved in the ring manager is illustrated in FIG. 5. As for any station, credit C is set to TB if there is a predefined maximum of bytes allowed to be transmitted and T is set to the clock time (step 92). After the initialization of the ring manager parameters, this one waits for the token frame (step 94) and loops back as long as the token frame is not received (step 96).

Then, the ring manager reads in the token frame, the number of stations in each class of bandwidth that is $N_H$, $N_M$, $N_N$, and $N_L$ (step 98). Based upon the predefined values of $K_H$, $K_M$, $K_N$ and the above formula, the ring manager computes the CIR value for each class (step 100). After that, the values $N_H$, $N_M$, $N_N$ and $N_L$ corresponding to the number of stations recorded for each class in the token frame are reset to 0 (step 102).

Then, the ring manager being also a station of the ring, it achieves the station processing corresponding to steps 66, 68 and 70 of FIG. 3 as any other station. Thus, if the ring manager selects the High class of bandwidth, the value of $N_H$ in the token frame is incremented form 0 to 1.

After that, the ring manager sets the CIR values in the token frame to the values which have been previously computed (step 104). Finally, the ring manager sends the token frame to the next station on the logical ring before the process loops back to a new initialization of the ring manager parameters.

Note also that the value of CIR for the Low class and therefore the other values of CIR depend upon the total bandwidth used by the network and upon the predefined values of coefficients K.

It must be noted that the value of TB is configurable on each station. This parameter should allow a station that has not transmitted for a certain time to transmit several frames with only one token. But, the value of TB must not be too high to avoid generating a peak of traffic. A good value for TB is 3×1500 bytes (1500 bytes corresponds to the MTU on Ethernet) which allows the transmission of 3 large Ethernet frames.

We claim:

1. A method for dynamic bandwidth management in a logical ring network, the method comprising:
   circulating a token frame among a plurality of workstations;
   adjusting a transmission size credit (C) in response to a token round trip time (TRTT) variable;
   adjusting the transmission size credit (C) in response to a committed information rate (CIR) variable associated with a bandwidth class; and
   assigning a value for the CIR variable based on a total network bandwidth, the bandwidth class of each of the plurality of workstations, and a predefined coefficient K associated with the bandwidth class.

2. The method of claim 1, further comprising assigning a bandwidth class to at least one of the plurality of workstations.

3. The method of claim 1, wherein the token frame includes a set of bandwidth classes and a corresponding set of CIR variables.

4. The method of claim 1, further comprising limiting a maximum value of the transmission size credit (C) to a predefined transmission burst (TB) parameter.

5. The method of claim 1, further comprising transmitting a frame, or a series of frames, from one of the plurality of workstations as long as the transmission size credit (C) is equal to or greater than the frame size (FS) of the frame, or the series of frames, to be transmitted.

6. A method for dynamic bandwidth management in a logical ring network, the method comprising:
   circulating a token frame among a plurality of workstations;
   adjusting a transmission size credit (C) in response to a token round trip time (TRTT) variable;
   adjusting the transmission size credit (C) in response to a committed information rate (CIR) variable associated with a bandwidth class;
   assigning a value for the CIR variable based on a total network bandwidth, the bandwidth class of each of the plurality of workstations, and a predefined coefficient K associated with the bandwidth class;
   assigning a bandwidth class to at least one of the plurality of workstations;
   limiting a maximum value of the transmission size credit (C) to a predefined transmission burst (TB) parameter; and
   transmitting a frame, or a series of frames, from one of the plurality of workstations as long as the transmission size credit (C) is equal to or greater than the frame size (FS) of the frame, or the series of frames, to be transmitted.

7. An apparatus for dynamic bandwidth management in a logical ring network, the apparatus comprising:
   a ring master module configured to circulate a token frame among a plurality of workstations;
   a TRTT adjustment module configured to adjust a transmission size credit (C) in response to a token round trip time (TRTT) variable;
   a CIR adjustment module configured to adjust the transmission size credit (C) in response to a committed information rate (CR) variable associated with a bandwidth class; and
   a CIR assignment module configured to assign a value for the CIR variable based on a total network bandwidth, the bandwidth class of each of the plurality of workstations, and a predefined coefficient K associated with the bandwidth class.

8. The apparatus of claim 7, further comprising a subscription module configured to assign a bandwidth class to at least one of the plurality of workstations.

9. The apparatus of claim 7, wherein the token frame includes a set of bandwidth classes and a corresponding set of CIR variables.

10. The apparatus of claim 7, further comprising a TB module configured to limit a maximum value of the transmission size credit (C) to a predefined transmission burst (TB) parameter.

11. The apparatus of claim 7, further comprising a transmission module configured to transmit a frame, or a series of frames, from one of the plurality of workstations as long as the transmission size credit (C) is equal to or greater than the frame size (FS) of the frame, or the series of frames, to be transmitted.

12. An apparatus for dynamic bandwidth management in a logical ring network, the apparatus comprising:
   a ring master module configured to circulate a token frame among a plurality of workstations;
   a TRTT adjustment module configured to adjust a transmission size credit (C) in response to a token round trip time (TRTT) variable;
   a CIR adjustment module configured to adjust the transmission size credit (C) in response to a committed information rate (CIR) variable associated with a bandwidth class;
   a CIR assignment module configured to assign a value for the CIR variable based on a total network bandwidth, the bandwidth class of each of the plurality of workstations, and a predefined coefficient K associated with the bandwidth class;
   a subscription module configured to assign a bandwidth class to at least one of the plurality of workstations;
   a TB module configured to limit a maximum value of the transmission size credit (C) to a predefined transmission burst (TB) parameter; and
   a transmission module configured to transmit a frame, or a series of frames, from one of the plurality of workstations as long as the transmission size credit (C) is equal to or greater than the frame size (FS) of the frame, or the series of frames, to be transmitted.

13. A system for dynamic bandwidth management in a logical ring network, the system comprising:
   a logical ring network;
   at least one workstation connected to the logical ring network and associated with a bandwidth class;
   a ring master station connected to the logical ring and configured to circulate a token frame among the workstations connected to the logical ring network;
   a token frame including a set of bandwidth classes and a corresponding set of CIR variables; and
   a transmission size credit (C) associated with a committed information rate (CIR) variable, a maximum value of the credit (C) limited to a predefined transmission burst (TB) parameter.

14. A workstation for dynamic bandwidth management in a logical ring network, the workstation comprising:
   a subscription module configured to subscribe the workstation to a bandwidth class associated with a guaranteed information rate based on a committed information rate (CIR) variable corresponding to the subscribed bandwidth class;
   a token frame module configured to receive a token frame from a ring master station, the token frame including a value for the CIR variable corresponding to the subscribed bandwidth class of the workstation; and
   a transmission module configured to transmit a frame, or a series of frames, from the workstation as long as the transmission size credit (C) is equal to or greater than the frame size (FS) of the frame, or the series of frames, to be transmitted.

15. A ring master station for dynamic bandwidth management in a logical ring network, the ring master station comprising:
   a ring master module configured to circulate a token frame among a plurality of workstations;

a TRTT adjustment module configured to adjust a transmission size credit (C) in response to a token round trip time (TRTT) variable;

a CIR adjustment module configured to adjust the transmission size credit (C) in response to a committed information rate (CIR) variable associated with a bandwidth class;

a CIR assignment module configured to assign a value for the CIR variable based on a total network bandwidth, the bandwidth class of each of the plurality of workstations, and a predefined coefficient K associated with the bandwidth class; and a TB module configured to limit a maximum value of the transmission size credit (C) to a predefined transmission burst (TB) parameter.

16. An apparatus for dynamic bandwidth management in a logical ring network, the apparatus comprising:

means for circulating a token frame among a plurality of workstations;

means for adjusting a transmission size credit (C) in response to a token round trip time (TRTT) variable;

means for adjusting the transmission size credit (C) in response to a committed information rate (CIR) variable associated with a bandwidth class;

means for assigning a value for the CIR variable based on a total network bandwidth, the bandwidth class of each of the plurality of workstations, and a predefined coefficient K associated with the bandwidth class;

means for assigning a bandwidth class to at least one of the plurality of workstations;

means for limiting a maximum value of the transmission size credit (C) to a predefined transmission burst (TB) parameter; and means for transmitting a frame, or a series of frames, from one of the plurality of workstations as long as the transmission size credit (C) is equal to or greater than the frame size (FS) of the frame, or the series of frames, to be transmitted.

17. A computer program product for dynamic bandwidth management in a logical ring network, the computer program product comprising computer readable medium having a computer program code configured to conduct the steps of:

circulating a token frame among a plurality of workstations;

adjusting a transmission size credit (C) in response to a token round trip time (TRTT) variable;

adjusting the transmission size credit (C) in response to a committed information rate (CIR) variable associated with a bandwidth class; and assigning a value for the CIR variable based on a total network bandwidth, the bandwidth class of each of the plurality of workstations, and a predefined coefficient K associated with the bandwidth class.

* * * * *